United States Patent
Chen

(10) Patent No.: US 12,053,881 B1
(45) Date of Patent: Aug. 6, 2024

(54) MULTI-LAYER OPERATING SYSTEM AND METHOD FOR MOBILE ROBOTS

(71) Applicant: Hongming Chen, Hong Kong (HK)

(72) Inventor: Hongming Chen, Hong Kong (HK)

(73) Assignee: Rainbow Dynamics LLC, Arlington, TX (US)

( * ) Notice: Subject to any disclaimer, the term of this patent is extended or adjusted under 35 U.S.C. 154(b) by 0 days.

(21) Appl. No.: 18/629,806

(22) Filed: Apr. 8, 2024

(51) Int. Cl.
*B25J 5/00* (2006.01)
*B25J 9/16* (2006.01)

(52) U.S. Cl.
CPC ............. *B25J 5/007* (2013.01); *B25J 9/1661* (2013.01); *B25J 9/1664* (2013.01)

(58) Field of Classification Search
CPC ...... G05B 13/0265; G05B 2219/49023; G05B 23/0283; G05B 19/418; G05B 17/02; G05B 23/024; G05B 9/03; H04W 48/16; H04W 72/12; H04W 8/24; H04W 16/28; H04W 4/00; B65G 47/086; B65G 1/04; B65G 2814/0305; B65G 57/03
See application file for complete search history.

(56) References Cited

U.S. PATENT DOCUMENTS

2017/0331670 A1* 11/2017 Parkvall .............. H04L 41/0233
2023/0098602 A1* 3/2023 Cella .................... B29C 64/386
700/248

FOREIGN PATENT DOCUMENTS

TW 202241782 A * 11/2022 .............. B65G 1/04

OTHER PUBLICATIONS

G. S. Oliveira, J. T. Carvalho and P. D. M. Plentz, "On the Effect of Heterogeneous Robot Fleets on Smart Warehouses' Order Time, Energy, and Operating Costs," 2022 XII Brazilian Symposium on Computing Systems Engineering (SBESC) (Year: 2022).*

* cited by examiner

*Primary Examiner* — Khoi H Tran
*Assistant Examiner* — Bryant Tang
(74) *Attorney, Agent, or Firm* — Sam Pierce

(57) ABSTRACT

The application provides a multi-layer operating system and method for mobile robots. The multi-layer operating system includes a stacked multi-layer operation platform, a warehouse control system and a robot control system, wherein the operation platform is configured for bearing mobile robots to perform an operation; the warehouse control system is configured for generating a target operation instruction based on a received operation task; the robot control system is configured for allocating the target operation instruction to a corresponding mobile robot for execution according to position information and state information about the mobile robot; and the warehouse control system is further configured for acquiring a robot idle degree parameter respectively corresponding to each layer of the operation platform, and determining a mobile robot deployment scheme. The application enables achieving multi-level simultaneous operation of the mobile robots, thereby improving space utilization, operation efficiency and an upper limit of the operation efficiency.

10 Claims, 2 Drawing Sheets

MULTI-LAYER OPERATING SYSTEM AND METHOD FOR MOBILE ROBOTS

TECHNICAL FIELD

The application relates to the field of logistics automation, and more particularly to a multi-layer operating system and method for mobile robots.

BACKGROUND ART

With the development of logistics technology, mobile robots are more and more widely deployed in logistics applications. However, the existing mobile robots operate on a single-layer operation platform (including a single-layer of mechanical platform or the ground). The single-layer operation not only has a low space utilization rate and a low work efficiency, but also has a low upper limit of operation efficiency. Thus, it is urgently needed to improve.

SUMMARY OF THE INVENTION

In view of the above-mentioned deficiencies of the prior art, it is an object of the application to provide a multi-level operating system and method for mobile robots to achieve multi-level simultaneous operation of the mobile robots, thereby improving space utilization, operation efficiency and an upper limit of the operation efficiency.

In order to achieve the above-mentioned object, the application adopts the following technical solutions.

In a first aspect, the application provides a multi-layer operating system for mobile robots, comprising a stacked multi-layer operating system, a warehouse control system, and a robot control system, wherein the operation platform is configured for bearing mobile robots to perform an operation;

the warehouse control system is configured for generating a target operation instruction based on a received operation task; the robot control system is configured for allocating the target operation instruction to a corresponding mobile robot for execution according to position information and state information about the mobile robot; and the warehouse control system is further configured for acquiring a robot idle degree parameter respectively corresponding to each layer of the operation platform, and determining a mobile robot deployment scheme corresponding to the corresponding operation platform based on the robot idle degree parameter.

Further, the number of the robot control systems is the same as the number of layers of the operation platform; and the robot control systems are arranged in one-to-one correspondence with the operation platforms;

wherein different robot control systems communicate with the mobile robots corresponding to the operation platform via wireless signals of different frequency bands.

Further, each layer of the operation platform has at least one load port and at least one discharge port, respectively;

the target operation instruction is configured for instructing to transfer goods at a corresponding load port to a corresponding discharge port on the operation platform of the same layer; the mobile robot returns to the corresponding load port to wait in line after executing the target operation instruction; and the idle degree parameter comprises an idle robot recirculation coefficient, wherein the idle robot recirculation coefficient corresponding to each operation platform is calculated based on the number of mobile robots waiting within a predetermined distance range of each load port of the corresponding operation platform.

Further, the idle robot recirculation coefficient $R_M$ for an $M^{th}$ layer of the operation platform is calculated by:

$$R_M = \frac{L1 * \sum_{j=1}^{L1}(s_{1,j}) + L2 * \sum_{j=1}^{L2}(s_{2,j}) + \ldots + Ln * \sum_{j=1}^{Ln}(s_{n,j})}{n}$$

where n indicates the number of load ports on the $M^{th}$ layer of operation platform; $L_i$ indicates the number of mobile robots waiting within the predetermined distance range of an $i^{th}$ load port on the $M^{th}$ layer of operation platform; and $S_{i,j}$ indicates the average value of a shortest walking distance data from a $j^{th}$ mobile robot waiting within the predetermined distance range of the $i^{th}$ load port on the $M^{th}$ layer of operation platform to each discharge port on the same layer.

Further, each of the operation platforms includes a plurality of grid regions arranged in rows and columns; the mobile robot travels in a row or column direction on the respective operation platform; and the shortest travel distance data is a minimum number of grid regions traveled by the respective mobile robot.

Further, when the ratio of the robot idle degree parameter corresponding to one layer of the operation platform to the robot idle degree parameter corresponding to another layer of the operation platform is greater than a first predetermined threshold and it continues for a predetermined duration, the mobile robot deployment scheme determined by the warehouse control system includes allocating a corresponding number of mobile robots on the one layer of operation platform to the other layer of operation platform according to the ratio.

Further, a cross-layer access is connected between adjacent layers of the operation platforms to enable the mobile robot to deploy to different layers of operation platforms via the cross-layer access.

Further, the multi-level operating system further includes:

a load mechanism configured for transferring goods to the load ports of the operation platforms at different layers; and a discharge mechanism configured for unloading goods from the discharge ports of the operation platforms at different layers.

In a second aspect, the application provides a multi-level operating method for mobile robots, comprising:

providing a stacked multi-layer operation platform, wherein the operation platform is configured for bearing mobile robots to perform an operation;

generating a target operation instruction based on a received operation task;

allocating the target operation instruction to a corresponding mobile robot for execution according to position information and state information about the mobile robot; and acquiring a robot idle degree parameter respectively corresponding to each layer of the operation platform, and determining a mobile robot deployment scheme corresponding to the corresponding operation platform based on the robot idle degree parameter.

Further, the determining a mobile robot deployment scheme corresponding to the corresponding operation platform based on the robot idle degree parameter comprises:

when the ratio of the robot idle degree parameter corresponding to one layer of the operation platform to the robot idle degree parameter corresponding to another layer of the operation platform is greater than a first predetermined threshold and it continues for a predetermined duration, determining to allocate a corresponding number of mobile robots on the one layer of operation platform to the other layer of operation platform according to the ratio.

By means of the above-mentioned technical solutions, the application has the following beneficial effects.

In the application, by providing the multi-layer operating system, the mobile robot can achieve multi-layer operation, thereby improving the space utilization rate of a unit floor area, increasing the upper limit of the number of mobile robots that can be accommodated, and thus improving the operation efficiency and the upper limit of the operation efficiency. Meanwhile, after receiving the target operation instruction, the application performs instruction allocation according to the position information and state information about each mobile robot, which can ensure the rational scheduling of mobile robot resources and further ensure operation efficiency. In addition, in the application, by acquiring the robot idle degree parameter respectively corresponding to each layer of operation platform, and determining the robot deployment scheme corresponding to the corresponding operation platform based on the robot idle degree parameter, the robot deployment between multiple layers can be realized to solve the problem of load imbalance between multiple layers of operation platforms and further improve the operation efficiency.

DETAILED DESCRIPTION

In order that the objects, aspects, and advantages of the application will become more apparent, a more particular description of the application will be rendered by reference to the appended drawings and embodiments. It should be understood that the specific examples described herein are merely used for explanation of the application and are not intended to be limiting thereof. Based on the embodiments in the disclosure, all other embodiments obtained by a person skilled in the art without involving any inventive effort are within the scope of protection of the disclosure.

The terms used in the application are provided for the purpose of describing particular embodiments only and not intended to be limiting of the disclosure. As used in the disclosure and the appended claims, the singular forms "a", "an", and "the" are intended to include the plural forms as well, unless the context clearly indicates otherwise. It should also be understood that the term "and/or" as used herein refers to and encompasses any and all possible combinations of one or more of the associated listed items.

Embodiment 1

Figure 1:
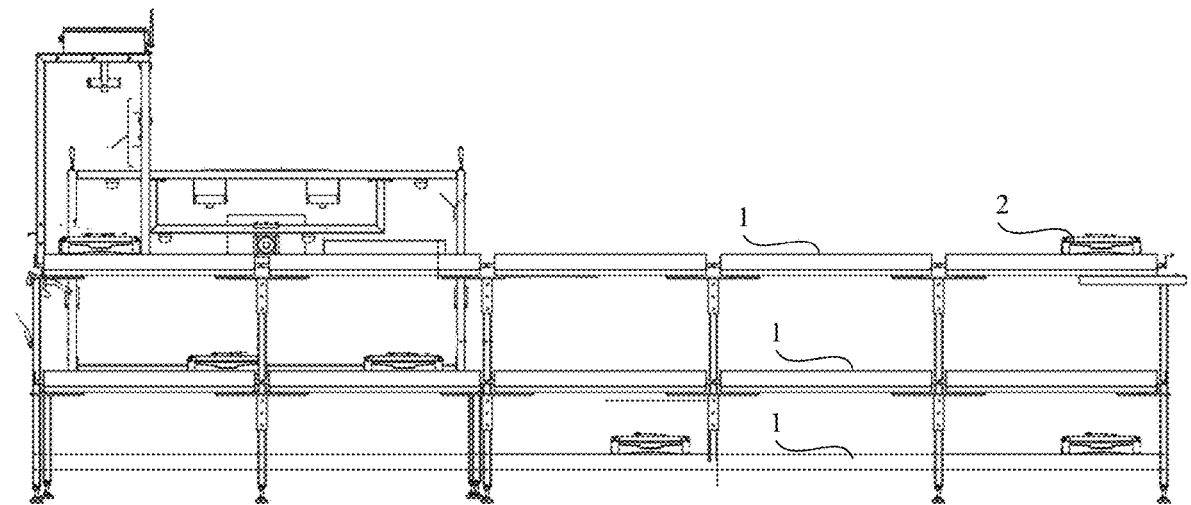
FIG. 1 is a schematic structural diagram of a multi-layer operation platform according to the application.
Figure 2:
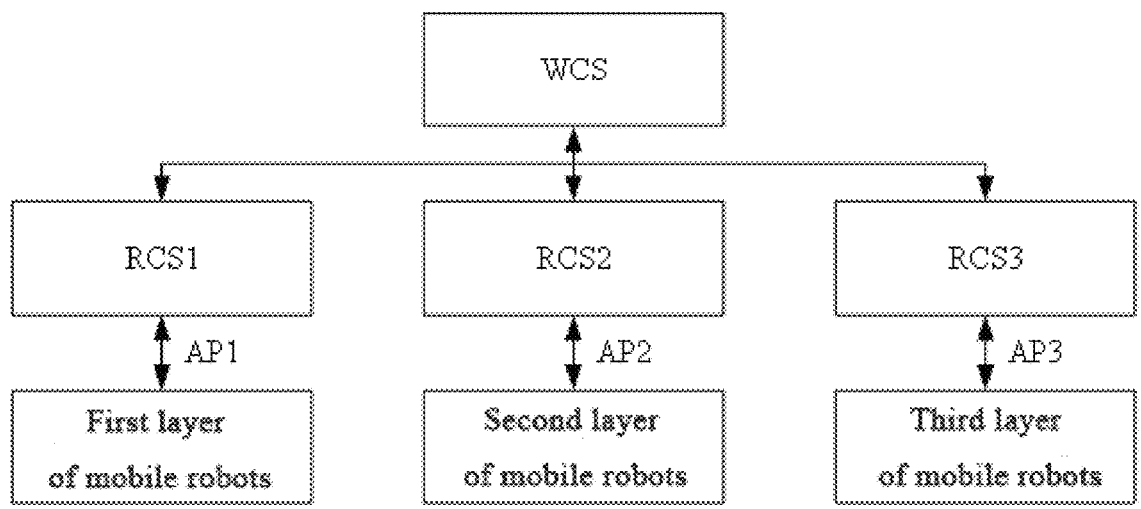
FIG. 2 is a hardware architecture diagram of a multi-layer operating system for mobile robots according to the application.

The embodiment provides a multi-layer operating system for mobile robots. As shown in FIGS. 1 and 2, the multi-layer operating system includes a stacked multi-layer operation platform (illustratively shown as three layers) and also includes a warehouse control system WCS and a robot control system RCS.

Specifically, the embodiment deploys a multi-layer operation platform within a logistics warehouse. Each layer of operation platform may be used to bear mobile robots for an operation. The embodiment does not impose any particular limitation on the number of layers of the operation platforms 1. Two, three, four or more layers of the operation platforms 1 may be provided according to actual needs. Preferably, a substantially rectangular mechanical platform is used for each operation platform 1. The operation platforms are of the same size and are arranged one above the other in the height direction. Each operation platform 1 has at least one load port and at least one discharge port, respectively.

In a preferred embodiment, in order to realize independent scheduling in which the multi-layered robots do not interfere with each other, the embodiment configures the number of robot control systems RCS to be the same as the number of layers of the operation platform 1 and the both are set in a one-to-one correspondence. Also, different robot control systems RCS communicate with the mobile robots 2 on the corresponding operation platform 1 by wireless signals of different frequency bands.

For example, as shown in FIGS. 1 and 2, the number of layers of the operation platform 1 is three, and the number of robot control systems RCS is three (denoted as RCS1, RCS2, and RCS3, respectively). Among them, the RCS1 corresponds to a first layer, namely, it independently controls mobile robots 2 on a first layer of operation platform 1, and can specifically communicate with the mobile robots 2 of the layer via a wireless transmitter AP1 installed on the first layer of operation platform 1. The RCS2 corresponds to a second layer, namely, it independently controls mobile robots 2 on a second layer of operation platform 1, and can specifically communicate with the mobile robots 2 of the layer via a wireless transmitter AP2 installed on the second layer of operation platform 1. The RCS3 corresponds to the third layer, namely, it independently controls the mobile robots 2 on the third layer of operation platform 1, and can specifically communicate with the mobile robots 2 of the layer via a wireless transmitter AP3 mounted on the third layer of operation platform 1. Thus, different layers of mobile robots 2 may be scheduled independently by different robot control systems RCS, achieving scheduling isolation.

Meanwhile, in order to prevent mutual interference of wireless signals of different layers, the present embodiment adjusts AP1, AP2 and AP3 to different frequency bands, respectively. For example, the communication frequency band of the AP1 may be adjusted to 920 MHZ. Accordingly, the communication frequency band of the mobile robot 2 on the first layer of operation platform 1 is also adjusted to 920 MHZ. The communication frequency band of the AP2 may be adjusted to 925 MHZ. Accordingly, the communication frequency band of the mobile robot 2 on the second layer of operation platform 1 is also adjusted to 925 MHZ. The communication frequency band of the AP3 may be adjusted to 928 MHZ. Accordingly, the communication frequency band of the mobile robot 2 on the third layer of operation platform 1 is also adjusted to 928 MHZ. It should be understood that the frequency bands set forth herein are exemplary and not limiting, and that other desirable frequency bands may be used. When the radius of the coverage area is larger than a predetermined distance (e.g., 20 m), it is necessary to increase the signal relaying device to enlarge the signal area.

In a specific work process, the warehouse control system WCS is used for receiving an operation task issued by the warehouse control system WMS, and generating, based on the received operation task, a target operation instruction which can be executed by the mobile robot 2. The target operation instruction is specifically used for instructing to transfer goods of a corresponding load port on an operation platform of a specified layer to a corresponding discharge port of the same layer. WCS then issues the target operation instruction to the RCS corresponding to the specified layer.

After receiving the target operation instruction, RCS will select one mobile robot 2 as the target object according to the position information and state information, etc. of each mobile robot 2 at the specified layer, and assign the target operation instruction to the target object for execution.

In the present embodiment, the position information refers to a position where the mobile robot 2 is currently located, and the state information may include power state information and/or operation state information (such as being in an operation state or a waiting state) of the mobile robot 2. When selecting a target object, RCS may construct an object constraint condition based on state information (for example, a mobile robot 2 in a power shortage state or in an operation state is prohibited as the target object), and combine with position information to select a mobile robot 2 with the shortest walking path when executing a target operation instruction as the target object.

Then, the RCS allocates the target operation instruction to the target object and provides a corresponding navigation path. Thus, the target object may execute the corresponding target operation instruction according to the navigation path. After the target object finishes executing the target operation instruction, the target object will return to the corresponding load port and wait for the next operation instruction to be executed. In this embodiment, the navigation path provided should satisfy collision avoidance constraints that the target object should not collide with other mobile robots 2 while executing the target operation instruction.

When the execution of the target operation instruction is completed, the corresponding RCS collects the task execution completion data into the WCS so as to form a unified task completion list. If the target operation instruction is not completed due to an accident or the like, it is also collected into WCS to generate a corresponding list of incomplete tasks and notify manual emergency processing.

In addition, since the mobile robots 2 at different layers may have the problem of unbalanced workload, the warehouse control system WCS of the present embodiment is further configured for acquiring a robot idle degree parameter respectively corresponding to each layer of the operation platforms 1, and determining the mobile robot deployment scheme corresponding to the corresponding operation platforms 1 based on the robot idle degree parameter.

Preferably, the idle degree parameter is, for example, an idle robot recirculation coefficient, where the idle robot recirculation coefficient corresponding to each operation platform 1 may be calculated based on the number of mobile robots waiting within a predetermined distance range of each load port of the corresponding operation platform 1. In the present embodiment, the idle robot recirculation coefficient reflects the idle degree of the corresponding layer of mobile robots. The larger the coefficient, the lower the utilization rate of the corresponding layer of mobile robots 2.

In an embodiment, the idle robot recirculation coefficient corresponding to an $M^{th}$ layer of the operation platform 1 is specifically calculated by the following formula:

$$R_M = \frac{L1 * \sum_{j=1}^{L1}(s_{1,j}) + L2 * \sum_{j=1}^{L2}(s_{2,j}) + \ldots + Ln * \sum_{j=1}^{Ln}(s_{n,j})}{n}$$

where n indicates the number of load ports on the $M^{th}$ layer of operation platform 1; $L_i$ indicates the number of mobile robots 2 waiting within the predetermined distance range of an $i^{th}$ load port on the $M^{th}$ layer of operation platform; and $S_{i,j}$ indicates the average value of a shortest walking distance data from a $j^{th}$ mobile robot waiting within the predetermined distance range of the $i^{th}$ load port on the $M^{th}$ layer of operation platform to each discharge port on the same layer.

Figure 3:
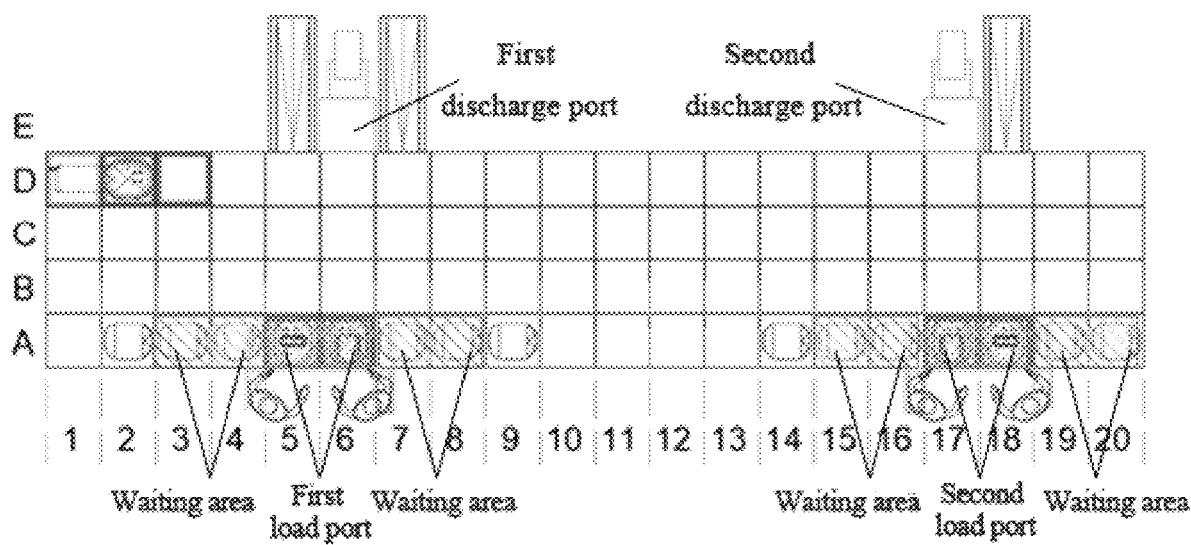
FIG. 3 is a schematic diagram for calculating a recirculation coefficient of idle robots according to the application.

In the present embodiment, as shown in FIG. 3, each operation platform 1 may be divided into a plurality of equally sized grid areas arranged in a matrix in the form of rows and columns, respectively. The mobile robot 2 is configured for traveling in the row and column directions on the corresponding operation platform 1. Thus, the minimum number of grid areas traveled by the mobile robot 2 may be taken as the aforementioned shortest travel distance data. On this basis, taking the application scenario shown in FIG. 3 as an example, the calculation process of the idle robot recirculation coefficient is described in detail as follows.

With specific reference to FIG. 3, the $M^{th}$ layer of operation platform is divided into grid areas of rows A-E and columns 1-20, where A5-A6 is a first load port of the layer; A17-A18 is a second load port of the layer; E6 is a first discharge port of the layer; E17 is a second discharge port of the layer; and two grid areas adjacent on two sides of each load port serve as waiting areas. The above-mentioned predetermined distance range is defined, for example, as within a range (except a waiting area) of five grid areas (the specific numerical values are determined according to needs) from the corresponding load port. Thus, it can be seen from FIG. 3 that the number of mobile robots 2 waiting within a predetermined distance range of the first load port is two (the first being located in an A2 grid area, and the second being located in an A9 grid area). Namely, $L_1$ is two. The number of mobile robots 2 waiting within the predetermined distance range of the second load port is one (located in an A14 grid area), i.e., $L_2$ is 1. Thus, an idle robot recirculation coefficient corresponding to the layer of the operation platform 1 may be obtained.

Here, for the first load port, the minimum number of grid regions from the first robot (at A2) waiting within the predetermined distance range to the first discharge port to walk through is 8. The minimum number of grid regions from the second discharge port to walk through is 19. Therefore, the average value of the shortest walking distance data from the first mobile robot within the predetermined distance range and so on of the first load port to each discharge port on the same layer is $$S_{1,1} = \frac{8+19}{2} = 13.5.$$

By the same reasoning, we can calculate the average value $S_{1,2}$ of the shortest walking distance data from the second mobile robot within the predetermined distance range and so on of the first load port to each lower discharge port on the same layer, and the average value $S_{2,1}$ of the shortest walking distance data from the mobile robot 2 waiting within the predetermined distance range of the second load port to each lower discharge port on the same layer.

The principle of using the above-mentioned formula to calculate the idle robot recirculation coefficient in the application is as follow. The state of whether the mobile robot is idle is constantly changing. Therefore, the application combines robot traffic flow and walking distance data to calculate a recirculation coefficient. At the same time, since it is continuously carrying on each layer during the operation, the mobile robot in the waiting area waits within expectation, and therefore is not included in the predetermined distance range.

In the present embodiment, when the warehouse control system determines the mobile robot deployment scheme, and when the ratio of the robot idle degree parameter corresponding to a certain layer of the operation platform 1 to the robot idle degree parameter corresponding to another layer of the operation platform 1 is greater than a first predetermined threshold value (if the first predetermined threshold value is 2) and it continues for a predetermined duration (if the predetermined duration is 2 minutes), the mobile robots 2 on the certain layer of the operation platform 1 are deployed to another layer of the operation platform 1, thereby achieving robot reallocation. The specific deployment quantity depends on the size of the ratio. The larger the ratio is, the more mobile robots are allocated.

Preferably, a cross-layer access (e.g., an elevator) is connected between adjacent layers of operation platforms 1 to facilitate deployment of mobile robots 2 to different layers by the cross-layer access.

In addition, when the ratio of the robot idle degree parameter corresponding to a certain layer of the operation platform to the robot idle degree parameter corresponding to another layer of the operation platform is less than a first predetermined threshold value (the first predetermined threshold value is 2, for example) and greater than a second predetermined threshold value (the second predetermined threshold value is 1.5, for example), and it continues for a predetermined duration, the warehouse control system does not perform robot deployment, but performs goods regulation, namely, reducing the quantity of goods delivered to the load port of the certain layer of the operation platform, and increasing the quantity of goods delivered to the load port of the other layer of the operation platform.

By the above-mentioned robot deployment and goods control mode, the robot idle degree parameter between two layers can be maintained as far as possible between 1-1.5, thereby solving the problem of load imbalance between multi-layer of operation platforms 1.

In this embodiment, the multi-level operating system further includes a load mechanism and a discharge mechanism. Herein, the load mechanism is used for transferring goods to the load port of the different layers of operation platforms 1, and the discharge mechanism is used for discharging goods from the discharge port of the different layers of operation platforms 1.

In an alternative embodiment, the load mechanism and the discharge mechanism both use a goods lifting mechanism. The goods lifting mechanism specifically includes a loading table and a lifting bracket for lifting the loading table so as to transfer the goods by lifting.

In another alternative embodiment, the discharge ports on different layers of the operation platforms are aligned in the height direction. The discharge mechanism includes a chute or channel communicating between the discharge ports on each layer of the operation platforms, thereby enabling to deliver goods on different layers to the same destination and achieving destination uniformity.

Embodiment 2

This embodiment provides a multi-level operating method for mobile robots. The method is implemented based on the multi-level operating system of Embodiment 1. The method specifically includes the following steps.

S1, a stacked multi-layer operation platform 1 is provided (see FIG. 1), where each operation platform 1 is respectively configured for bearing mobile robots 2 to perform work to perform an operation.

S2, a target operation instruction is generated based on a received operation task.

S3, the target operation instruction is allocated to a corresponding mobile robot 2 for execution according to the position information and state information about the mobile robot 2.

S4, a robot idle degree parameter respectively corresponding to each layer of the operation platform 1 is acquired, and a mobile robot deployment scheme corresponding to the corresponding operation platform is determined based on the robot idle degree parameter. Here, the robot idle degree parameter is calculated with reference to Embodiment 1.

Specifically, when the ratio of the robot idle degree parameter corresponding to one layer of the operation platform to the robot idle degree parameter corresponding to another layer of the operation platform is greater than a first predetermined threshold and it continues for a predetermined duration, it is determined to allocate a corresponding number of mobile robots 2 on one layer of operation platform to the other layer of operation platform according to the ratio.

In the application, by providing the multi-layer operation platform 1, the mobile robots 2 can achieve multi-layer operation, thereby improving the space utilization rate of a unit floor area, increasing the upper limit of the number of mobile robots 2 that can be accommodated, and thus improving the operation efficiency and the upper limit of the operation efficiency. Meanwhile, after receiving the target operation instruction, the application performs instruction allocation according to the position information and state information about each mobile robot 2, which can ensure the rational scheduling of mobile robot 2 resources and further ensure operation efficiency. In addition, in the application, by acquiring the robot idle degree parameter respectively corresponding to each layer of operation platform 1, and determining the robot deployment scheme corresponding to the corresponding operation platform 1 based on the robot idle degree parameter, the robot deployment between multiple layers can be realized to solve the problem of load imbalance between multiple layers of operation platforms 1.

While the specific implementation of the application is described above, it will be appreciated by those skilled in the art that the foregoing is illustrative only and that the scope of the application is defined by the appended claims. Those skilled in the art may make changes or modifications to these embodiments without departing from the principles and substance of the application, but these changes or modifications shall fall within the scope of protection of the application.

The invention claimed is:

1. A system for operating mobile robots, comprising:
a stacked multi-layer operating system having a plurality of layers;
a warehouse control system; and
one or more robot control systems, wherein:
the stacked multi-layer operating system is an operation platform configured for bearing mobile robots to perform an operation;
the warehouse control system is configured for generating a target operation instruction based on a received operation task;
the one or more robot control systems are configured for allocating the target operation instruction to a corresponding mobile robot for execution according to position information and state information about the mobile robot; and
the warehouse control system is further configured for acquiring a robot idle degree parameter respectively corresponding to each layer of the operation platform and determining a mobile robot deployment scheme corresponding to the corresponding operation platform based on the robot idle degree parameter.

2. The system for operating mobile robots according to claim 1, characterized in that the number of the robot control systems is the same as the number of layers of the operation platform; and the robot control systems are arranged in one-to-one correspondence with the operation platforms;
wherein different robot control systems communicate with the mobile robots corresponding to the operation platform via wireless signals of different frequency bands.

3. The system for operating mobile robots according to claim 1, characterized in that each layer of the operation platform has at least one load port and at least one discharge port, respectively;
the target operation instruction is configured for instructing to transfer goods at a corresponding load port to a corresponding discharge port on the operation platform of the same layer; the mobile robot returns to the corresponding load port to wait in line after executing the target operation instruction; and
the idle degree parameter comprises an idle robot recirculation coefficient, wherein the idle robot recirculation coefficient corresponding to each operation platform is calculated based on the number of mobile robots waiting within a predetermined distance range of each load port of the corresponding operation platform.

4. The system for operating mobile robots according to claim 3, characterized in that the idle robot recirculation coefficient $R_M$ for an $M^{th}$ layer of the operation platform is calculated by:

$$R_M = \frac{L1 * \sum_{j=1}^{L1}(S_{1,j}) + L2 * \sum_{j=1}^{L2}(S_{2,j}) + \ldots + Ln * \sum_{j=1}^{Ln}(S_{n,j})}{n}$$

where n indicates the number of load ports on the $M^{th}$ layer of operation platform; $L_i$ indicates the number of mobile robots waiting within the predetermined distance range of an $i^{th}$ load port on the $M^{th}$ layer of operation platform; and $S_{i,j}$ indicates the average value of a shortest walking distance data from a $j^{th}$ mobile robot waiting within the predetermined distance range of the $i^{th}$ load port on the $M^{th}$ layer of operation platform to each discharge port on the same layer.

5. The system for operating mobile robots according to claim 4, characterized in that each of the operation platforms includes a plurality of grid regions arranged in rows and columns; the mobile robot travels in a row or column direction on the respective operation platform; and the shortest travel distance data is a minimum number of grid regions traveled by the respective mobile robot.

6. The system for operating mobile robots according to claim 1, characterized in that when the ratio of the robot idle degree parameter corresponding to one layer of the operation platform to the robot idle degree parameter corresponding to another layer of the operation platform is greater than a first predetermined threshold and it continues for a predetermined duration, the mobile robot deployment scheme determined by the warehouse control system includes allocating a corresponding number of mobile robots on the one layer of operation platform to the other layer of operation platform according to the ratio.

7. The system for operating mobile robots according to claim 1, characterized in that a cross-layer access is connected between adjacent layers of the operation platforms to enable the mobile robot to deploy to different layers of operation platforms via the cross-layer access.

8. The system for operating mobile robots according to claim 3, characterized by the multi-layer operating system further comprises:
a load mechanism configured for transferring goods to the load ports of the operation platforms at different layers; and
a discharge mechanism configured for unloading goods from the discharge ports of the operation platforms at different layers.

9. A multi-layer operating method for mobile robots, comprising:
providing a stacked multi-layer operation platform, wherein the operation platform is configured for bearing mobile robots to perform an operation;
generating a target operation instruction based on a received operation task;
allocating the target operation instruction to a corresponding mobile robot for execution according to position information and state information about the mobile robot; and
acquiring a robot idle degree parameter respectively corresponding to each layer of the operation platform, and;
determining a mobile robot deployment scheme corresponding to the corresponding operation platform based on the robot idle degree parameter.

10. The multi-level operating method according to claim 9, characterized in that the determining a mobile robot deployment scheme corresponding to the corresponding operation platform based on the robot idle degree parameter comprises:
when the ratio of the robot idle degree parameter corresponding to one layer of the operation platform to the robot idle degree parameter corresponding to another layer of the operation platform is greater than a first predetermined threshold and it continues for a predetermined duration, determining to allocate a corresponding number of mobile robots on the one layer of operation platform to the other layer of operation platform according to the ratio.

* * * * *